United States Patent [19]

Decker

[11] 4,123,667
[45] Oct. 31, 1978

[54] WAVE ENERGY GENERATOR-BREAKWATER-BARGE-DOCK

[76] Inventor: Bert J. Decker, 136 Capen Blvd., Buffalo, N.Y. 14226

[21] Appl. No.: 781,531

[22] Filed: Mar. 28, 1977

[51] Int. Cl.² .............................................. F03B 13/12
[52] U.S. Cl. ..................................... 290/53; 417/330; 417/334; 60/398; 60/497; 137/512.15
[58] Field of Search ................ 417/61, 100, 240, 330, 417/331-334, 566; 290/42, 53; 60/398, 495-501; 137/512.15 X

[56] References Cited

U.S. PATENT DOCUMENTS

| 1,078,324 | 11/1913 | Truce | 417/100 |
| 3,307,827 | 3/1967 | Silvers | 290/53 X |
| 3,353,787 | 11/1967 | Semo | 60/398 |
| 3,989,951 | 11/1976 | Lesster et al. | 290/53 |

Primary Examiner—Robert K. Schaefer
Assistant Examiner—John W. Redman
Attorney, Agent, or Firm—Raymond F. Kramer

[57] ABSTRACT

A wave energy generator produces electric power from wave motion by means of a distortable underwater section thereof which has a plurality of flexible compartments containing liquid and gas and equipped with flexible internal one-way flow walls separating the compartments, so that in response to wave motion the internal liquid flows in one direction through the compartments and through a fluid flow-powered motor-generator combination. The underwater distortable flexible structure described is the lower portion of a body which also has an upper portion above water so that the combination thereof is useful as a breakwater or dock, when anchored, or as a barge.

14 Claims, 6 Drawing Figures

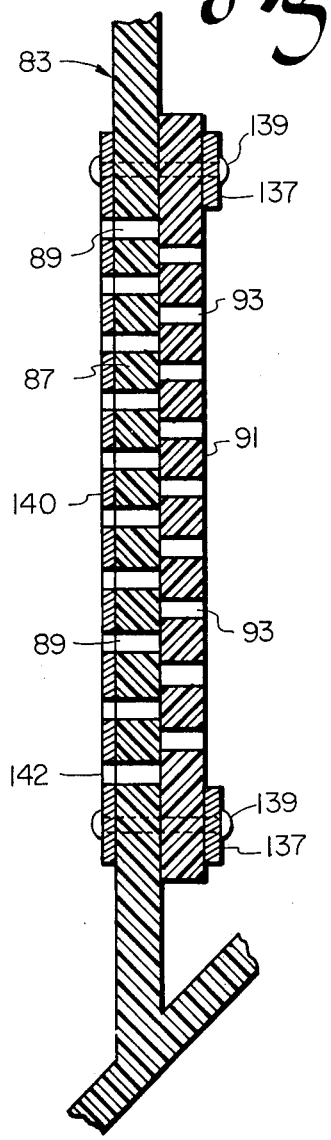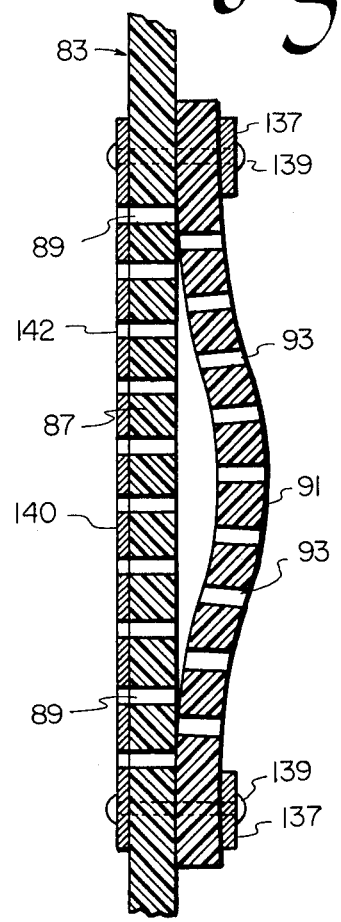

WAVE ENERGY GENERATOR-BREAKWATER-BARGE-DOCK

This invention relates to a wave energy generator. More particularly, it relates to such a generator which also functions as a breakwater, barge and dock and which generates electricity by converting wave motion to controlled liquid flow to run an electric generator.

Water power has long been used as a source of mechanical energy suitable for conversion to electrical energy. Although the best known applications of water power in this respect are those wherein water is dropped through turbines to drive electric generators or is flowed substantially horizontally through such turbogenerators, electricity has also been produced by conversion of wave motions to fluid flow and utilization of such flow to drive turbogenerators. In some such applications, there have been employed flexible bodies containing fluid, which bodies are distorted by wave motions and when compressed, force the confined fluid, such as a liquid, through a passageway to a motor generator for the generation of electricity. Sometimes electricity is not generated but the wave motion energy is utilized only to pump a fluid. Often, the fluid motors driven by the fluid motion and utilized to turn generators are air motors and the fluid pumped is, of course, air. Among prior art patents disclosing either pumping fluids by wave action or generating electricity from wave energy are U.S. Pat. Nos. 3,353,787; 3,758,788; 3,961,863; and 3,989,951, the last of which also describes a breakwater. U.S. Pat. No. 335,271 illustrates check valves similar to those employed in the present apparatuses. However, none of the apparatuses of the mentioned patents is of the structure of the apparatus of this invention, operates in the same manner and produces the same desirable results. The present invention utilizes a minimum of parts and such are readily available or may be manufactured at low cost. The devices of the invention operate in a simple and trouble-free manner and provide, in addition to electricity, breakwater, barge and dock functions.

In accordance with the present invention a wave energy generator-breakwater-barge-dock comprises an electric generator including relatively rotatable portions, the relative motion of which causes the production of electricity, means for relatively rotating such parts of the electric generator in response to liquid flow, a breakwater-barge-dock body for supporting the electric generator and the means for causing relative rotational motion of the parts thereof, which body comprises an upper portion and a lower portion, said lower portion being distortable in response to wave motions, having a plurality of flexible compartments therein with a gas inside said compartments at the tops thereof and a liquid inside said compartments at the bottoms thereof, a plurality of said compartments having flexible internal one-way flow walls separating them and said flexible compartments being communicated with the means for rotating the generator so that in response to the wave motion liquid flows from a downstream compartment through the means for rotating the generator, causing rotation of said means, out said means and back to an upstream compartment and through the plurality of compartments having one-way flow walls separating them to the downstream compartment. A wave energy generator, also within this invention, comprises a series of adjacent common-walled flexible compartments subject to wave motion and distortable by such motion to produce differential pressures between said compartments, the common walls of which compartments have openings therein with flexible covers thereover having openings therein which are disaligned with the openings in the common walls when the covers are in place against said walls and which covers are separated from the walls when the pressure of container liquid in said compartments is less on the cover sides of the walls than on the wall sides thereof so that the covers allow only one-way flow of the contained liquid through the series of compartments, and means communicating with upstream-most and downstream-most compartments, with respect to the movement of the contained liquid, for communicating such liquid with a motor-generator combination to generate electricity from the flow of the liquid. In more specific embodiments of the invention particular gases and liquids are utilized inside the flexible compartments, with the liquids being of certain densities and viscosities and with the proportions of volumes occupied by such gases and liquids being within given ranges, highly preferred types of flexible external and internal one-way flow walls and covers for these are present, the internal liquid which is flowed sequentially through the flexible compartments is recirculated, liquid flows are manifolded before and after being employed to rotate the electric generator, the wave energy generator-breakwater-barge-dock is of a preferred shape and the flexible compartmented lower portion thereof is lighter than water and helps to float the other, denser portion.

The invention will be readily understood by reference to the accompanying description, taken in conjunction with the drawing, in which:

FIG. 4 is a central vertical sectional view of a one-way wall section like that of FIG. 3, also in closed position;

FIG. 5 is a central vertical sectional view of the wall section of FIG. 4 in open or flow position.

Figure 1:
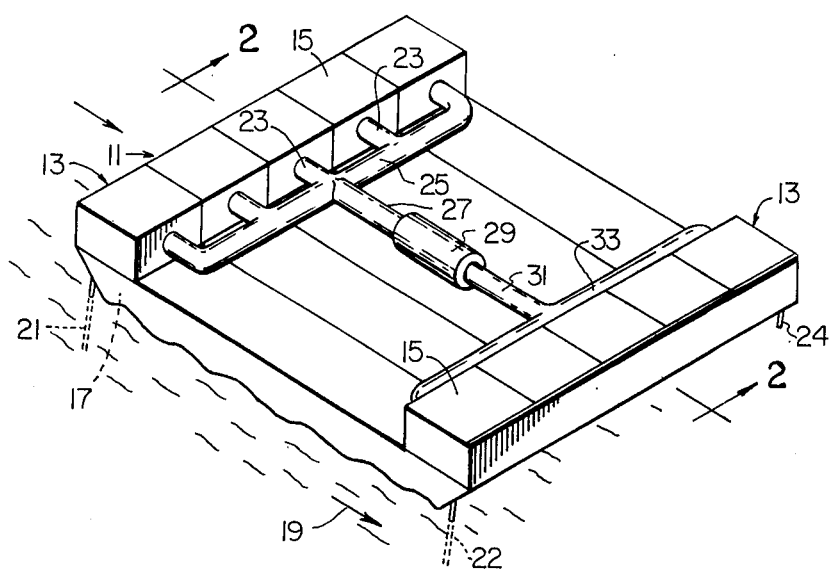
FIG. 1 is a perspective view, taken from above, of an apparatus of this invention in water having waves therein.

In FIG. 1 wave motion generator-breakwater-barge-dock 11 includes a plurality (here shown as five) of breakwater-barge-dock sections 13, each having an upper portion 15 and a lower flexible and distortable portion 17. As shown, the horizontal direction of wave or water motion is indicated at 19. Lines 21, 22 and 24 and other similar lines, not visible, hold the apparatus in position although in many instances it is not necessary or desirable to do so, as when the invention is being employed as a barge. Pipes 23 connect individual compartments of the separate breakwater-barge-dock body sections to manifold 25 and through it to piping 27 and fluid motor-electric generator 29. Similar piping 31 and manifold 33 and individual connecting pipes, not shown, are present upstream (with respect to fluid flow through turbogenerator 29) of the turbogenerator, similarly connecting the upstream sections of the joined together breakwater-barge-dock bodies to the turbogenerator. Turbogenerator 29 comprises an electric generator portion which includes relatively rotatable parts, usually an armature and a field coil, with the armature rotating within the electromagnetic field generated by the coil, causing the production of electricity, and a means for relatively rotating such parts of the electric generator in response to liquid flow, such as a liquid turbine or motor. Because such parts are conventional in turbogenerators they are not specifically illustrated herein.

Figure 2:
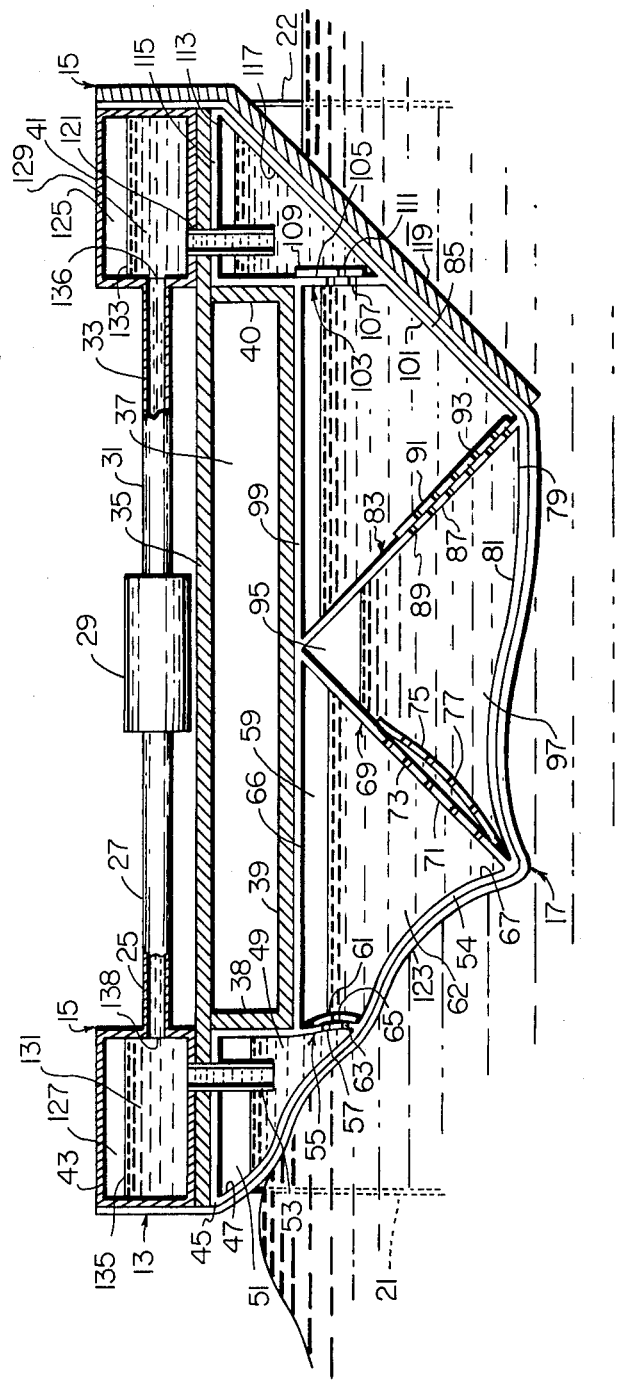
FIG. 2 is a vertical sectional elevational view of the apparatus of FIG. 1 along plane 2—2.

In FIG. 2 upper body portion 15 is shown to include base 35, walled flotation chamber 37, having walls 38, 39 and 40 thereabout forming such chamber with base 35, feed tank 41, manifold 33, piping 31, turbogenerator 29, piping 27, manifold 25 and surge tank 43, all of which are shown above the normal water line. The balance of the apparatus constitutes the lower distortable portion of the breakwater-barge-dock unit, a very important aspect of the invention. As illustrated, five flexible compartments are shown in the lower portion 17, one of which has a rigid wall, but the number of such compartments may be varied widely, usually ranging from 3 to 100, preferably 3 to 15. The most upstream of the compartments (with respect to fluid flow through them), that designated by numeral 45, is flexible and distortable because the wall 47 thereof is of a suitable material, such as a synthetic organic polymeric plastic, synthetic rubber or natural rubber. Compartment 45 encases a closed volume in which are present liquid 49 and gas 51. Liquid is fed into the compartment from "surge compartment" 43 through pipe or tube 53 which has its only opening in compartment 45 below the level of liquid 49. At the lower portion of compartment 45, where it is joined to adjacent next more downstream compartment 54, it includes a one-way flow wall 55, which comprises a separating wall portion 57 in common with adjacent compartment 54 and a flexible cover 61 on the downstream side of separating wall 57 (downstream with respect to the flow of liquid through such wall and cover). Wall 57 includes openings 63 and cover 61 includes openings 65 therein, with said openings being disaligned when the cover is in position flat against the separating wall so that in such state no flow of liquid occurs, and so that flow may occur when the cover is moved away from the surface of wall 57 and into compartment 54 in response to wave motion causing a greater pressure in compartment 45 than in compartment 54. Further details of preferred structures of the one-way flow walls of the present invention are given in the descriptions of FIG'S. 3-5, following.

Compartment 54 includes air and liquid spaces 59 and 62, respectively, top wall 66, bottom wall 67 and one-way wall 69, comprising a separating portion 71 with openings 73 therein and a cover portion 75 with openings 77 therein, such one-way wall separating compartment 54 from next adjacent more downstream compartment 79. Compartment 79 includes bottom wall 81 and one-way separating wall 83 between such compartment and next adjacent compartment 85. One-way wall 83 includes separating wall portion 87 having openings 89 therein and cover 91 having openings 93 therein. Compartment 79 includes air and liquid volumes 95 and 97, respectively. Compartment 85 is composed of an upper wall 99, a lower flexible wall 101 and one-way wall 103, together with one-way wall 83. One-way wall 103 includes separating wall 105 having openings 107 therein and cover 109 having openings 111 therein, through which liquid may flow into next adjacent compartment 113, which also has upper wall 115 and lower wall 117. Compartments 85 and 113 are partially rigidified on the bottoms thereof by covering plate 119, which provides resistance to distortions of the bottoms of such compartments so as to promote the forcing of liquid through the one-way wall 103 and into feed tank 41, from whence it passes through turbogenerator 29 to generate electricity. Like compartment 45, compartment 113 includes a pipe or tube 121 passing through the top wall 115 thereof into an elevated compartment (41), with the pipe bottom below the liquid level.

As shown, the wave motion generator-breakwater-barge-dock of this invention is protected by an external covering 123 of a flexible material, like that of the lower or external compartment walls but desirably, more durable. Also, there may be employed an additional cover of strong rigid material, not shown, e.g., perforated metal or screening, held away from the flexible wall to allow free access of wave motion to the wall. However, although helpful to avoid rupture of the wall by sharp objects and from sudden shocks due to the air cushions in the compartments, such is not necessary.

In elevated compartments 41 and 43, as in the various series-interconnected flexible compartments, air or gas spaces 125 and 127 will be maintained above liquid volumes 129 and 131, respectively, with the liquid levels 133 and 135 being maintained above outlets, 136 and 138 respectively. Similarly, the liquid levels in the various compartments of the lower portion of the breakwater-barge-dock units will be maintained sufficiently high so that air will not pass through the one-way walls and the proportions of air in the compartments will be sufficient to cushion them against wave motion shocks and thereby prevent damages to the compartments and the materials thereof. As illustrated the lower portions of the breakwater-barge-dock sections are separated by one-way walls, including separating sections and covers, each of which is of a single material thickness. Alternatively, each compartment may be of a continuous or seamless wall, such as neoprene bags, vulcanized, cemented or otherwise fastened together along the internal wall sections, having passageway holes therethrough and covered by a flexible, resilient or elastomeric covering, such as one of neoprene, with disaligned openings therein. If desired, portions of the separating walls near the openings may be partially rigidified, as by inclusion of backing plates therewith to prevent any excessive distortion so as to assure that when the cover lies flat against the separating wall the openings will be disaligned. However, although it may sometimes be desirable to increase the rigidity of portions of the separating walls to effect such purpose normally it is unnecessary and the desirable degree of flexibility, resilience or elasticity will be obtained by proper choice of the materials of construction and their thicknesses. In a variation of the present invention the separating portions of the one-way walls may be rigidified so that the primary distortions of the compartments by wave motions are of the external walls but usually such construction is not as efficient as that wherein the separating portions are also flexible.

Figure 3:
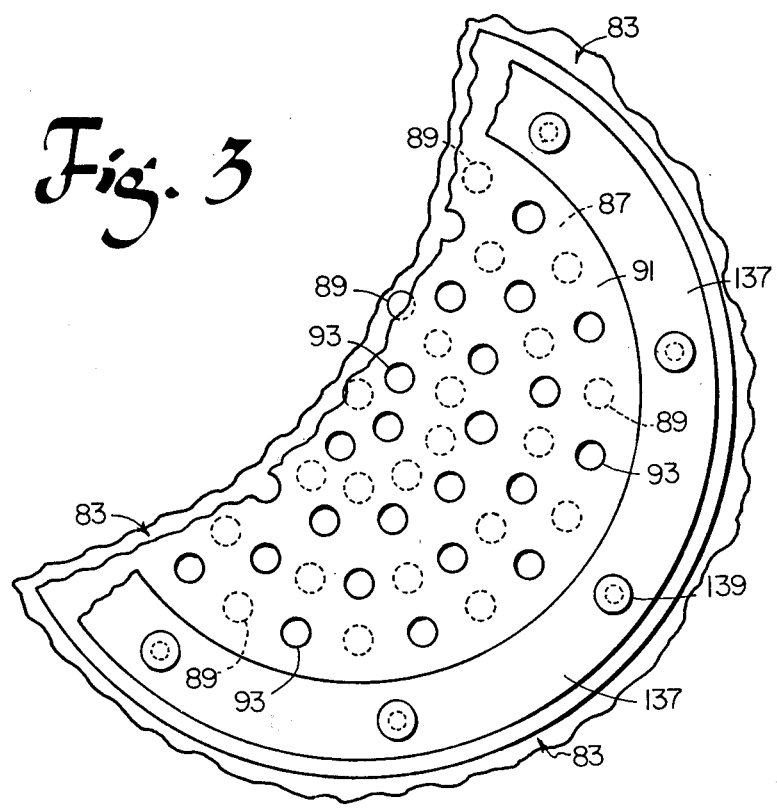
FIG. 3 is an elevational view of a substantial proportion of a flexible internal one-way flow compartment wall in non-flow position.

For simplicity of discussion and numbering it will be considered that the illustration of FIG. 3 is that of a portion of one-way wall 83 of FIG. 2, viewing from the cover side. Thus, separating wall portion 87 has openings 89 therein with cover 91 thereon having disaligned openings 93 therein. Cover 91 is held in place by peripheral flange 137, held by bolts 139. As shown, flange 137 is circular but rectangular and other forms thereof or other holding means may be employed and normally the form used will be that allowing greatest covering (and opening) of the separating wall portion below the liquid level. In addition to or instead of bolting the illustrated parts together they may be vulcanized, cemented or otherwise sealed. In FIG'S. 4 and 5 the type of one-way wall of FIG. 3 is shown in closed and opened positions, respectively. It will be noted that openings 89 in separating wall 87 are disaligned with respect to openings 93 in cover 91 but in FIG. 5, due to a greater pressure on the "upstream" side, liquid flows through the one-way wall, from compartment 79 to compartment 85 (see FIG. 2). Stiffening members 140 may be utilized to help maintain the shapes of separating walls 87 but are not normally required. When utilized, they will have openings 142 therein corresponding to the openings 89 in separating walls 87.

Instead of the peripherally held valves illustrated, which are highly preferred, and which desirably have approximately the same cross-sectional area of openings in the cover as in the separating portion (±30%, preferably ±10), there may be employed flap covers, having no openings therein and not being held about the entire periphery. However, these are less efficient and less readily controlled to be completely disaligned and with openings all closed off, when desired. Although various percentages of ratios of areas of openings to "closed" separating wall areas may be employed, normally it will be desirable for such a ratio to be at least 10%, preferably from 20 to 40%, whether the cover has a multiplicity of openings therein or is imperforate, and if it includes openings, it too will normally desirably have a ratio of a total area of the openings to the total of closed "wall" area of at least 10%, preferably from 20 to 40%. Instead of a multiplicity of openings the cover may have a single opening or a small number of openings disaligned with the plurality, e.g., 2 to 7, of openings in the separating wall and preferably centrally located with respect to such openings in such wall but it is preferred to have the same or approximately the same number of openings of the same or approximately the same sizes in the cover as in the wall. Generally, the area of the separating wall over which the perforations are distributed will be at least 20%, preferably 30 to 90% and more preferably 50 to 70% (leaving unperforated that portion of the wall adjacent the gas volume) and such area will often be in the lower linear 80%, frequently in the lower linear 60% of the wall. The openings will be below the compartment volumes occupied by cushioning gas and allowance will be made for changes in the liquid volumes and the shapes of those volumes in the various compartments during use.

Figure 6:
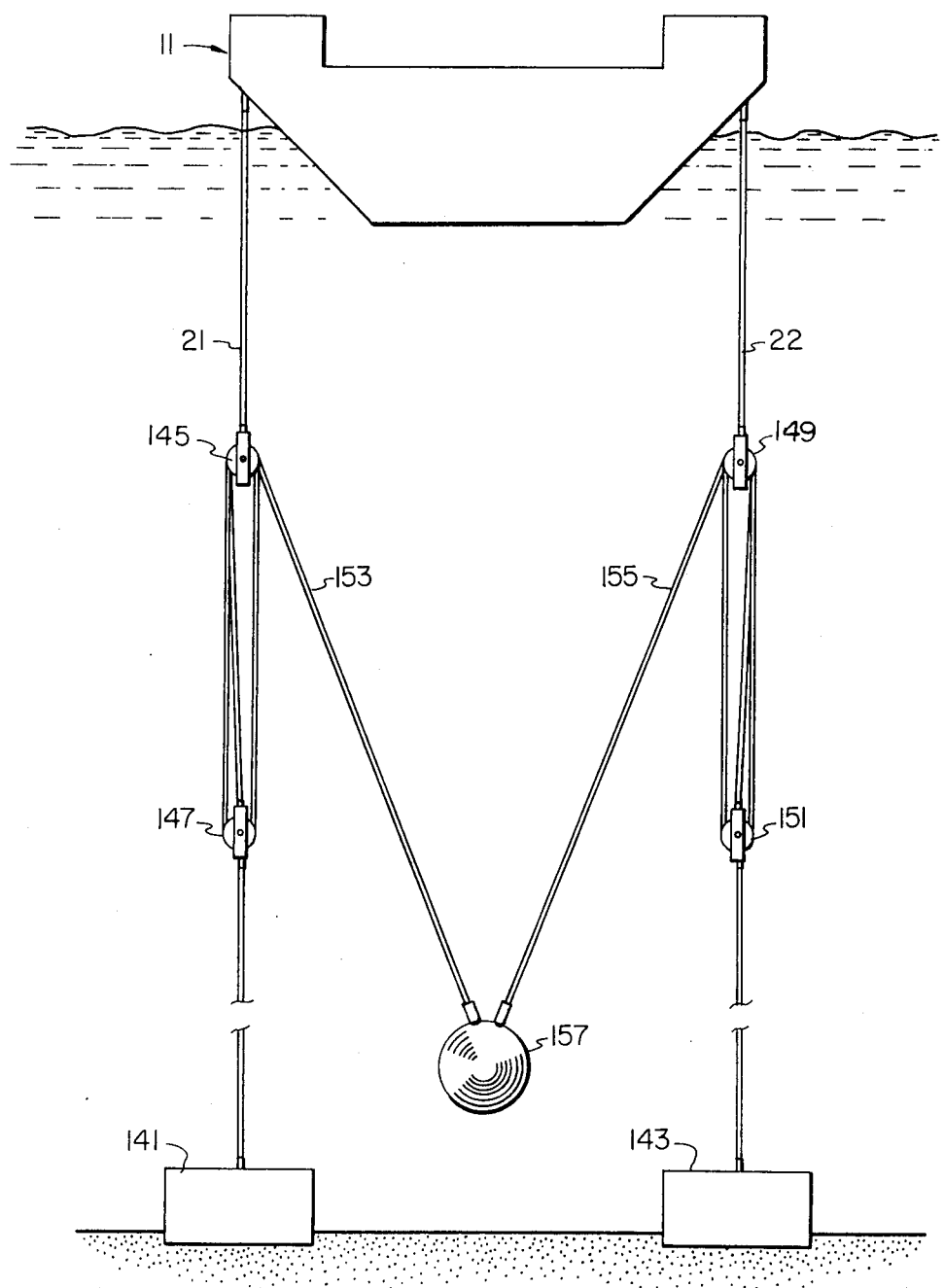
FIG. 6 is an end elevational view of the apparatus of FIG. 1, utilized as a generator-breakwater or generator-dock and held in position, yet movable in response to vertical and horizontal force components of wave motions and the tides.

In FIG. 6 the wave motion generator-breakwater-barge-dock 11 of this invention is shown restrictively but movably held to weight 157 by lines 21 and 22 to weights 141 and 143 by means of pulleys 145 and 147 and 149 and 151 and lines 153 and 155, respectively.

In operation the apparatus of this invention, anchored, releasably held to the bottom, floating freely, being towed or being employed as a self-propelled vessel, with a plurality of series-interconnected flexible, distortable, resilient and/or elastomeric compartments and separators between such compartments which are one-way flow walls, is subjected to wave motion and both the horizontal and vertical components thereof cause unequal pressures in the different compartments which result in one-way flow through them, causing the generation of electricity by turbogenerator 29. To obtain approximately constant hertz output from the generator, governors and flow control valves, not illustrated, may be installed in lines 31 and/or 27 or constant head controls may be installed in feed tank 41 to regulate the flow of liquid through turbogenerator 29. However, normally such are not required. Should it be considered desirable to change the facing of the apparatus with respect to the wave motion, this may readily be effected by altering the anchoring arrangement. In addition to generating electricity, the present apparatus may utilize such electricity to operate various mechanical devices, such as pumps, propellers for self-propelling the apparatus and winches. Also, instead of employing the electricity immediately or transmitting it to offshore or land consumers it may be utilized to charge batteries, for subsequent use. If desired, in some cases at least part of the wave power obtained may be employed directly mechanically, as in pumps, rather than being first converted to electricity. Yet, the use of the turbogenerator is preferred in accordance with the main aspect of this invention.

In the apparatus of this invention the breakwater-barge-dock body supports the electric generator and the means for rotating the parts thereof to generate electricity, preferably on a rigid or essentially rigid upper body portion which is normally heavier than water (although it can be made buoyant by the inclusion of trapped air therein). In some aspects of the invention the upper body portion may be somewhat flexible or distortable, too but an essentially rigid body is preferred. The lower portion of the apparatus is distortable in response to wave motions acting on the various flexible compartments thereof. The compartments each contain a liquid and a cushioning gas, with the proportions thereof desirably being 5 to 50% of the gas in each compartment, preferably 10 to 25% thereof, by volume, and the balance being liquid. Among the gases that may be employed are nitrogen, air, carbon dioxide, argon, helium and mixtures thereof and among the liquids are hydrocarbon oils, water (including sea water) alkanols of 2 to 20 carbon atoms, preferably of 6 to 18 carbon atoms, polyethoxylated alkanols, esters, ethers, alkanes, aromatic hydrocarbons, etc. In short, any suitable liquid may be employed which is compatible with the materials of the apparatus and of acceptable density and viscosity. A suitable density is in the range of 0.5 to 1.2 g./ml., preferably 0.7 to 1.1 g./ml. at 20° C. and a suitable viscosity is from 0.2 to 100 centipoises, preferably 0.1 to 1.5 centipoises, at 20° C.

The material of the cover, especially if it is peripherally fastened, is highly preferably an elastomeric one, such as a synthetic rubber, e.g., polychloroprene (neoprene), butadiene-styrene copolymer (SBR), polysulfide (Thiokol), acrylonitrile-butadiene copolymer (nitrile rubber), ethylene-propylene-diene (EPDM), polyisoprene, butyl (copolymer of isobutylene and isoprene), polyacrylonitrile, silicone (polysiloxane), epichlorohydrin and polyurethane rubbers. The properties of the synthetic elastomers described vary widely and provide a variety of types from which a particular rubber best suitable for use with the liquid being employed may be selected. In addition to the synthetic rubbers, natural rubber (polyisoprene) may also be used and is often preferable, although neoprene is usually better because of its higher resistance to chemical reactions such as oxidation. Rubbers used are usually cured, as by vulcanization, i.e., creation of sulfur cross-linkages. Instead of the described rubbers, there may also be employed for the cover various other synthetic organic polymeric plastic materials, such as polyethylene, fluorinated poly-lower hydrocarbons, e.g., Teflons, polyurethanes, nylons, polyvinyl chloride, polyvinylidene chloride, polyacrylates, e.g., polymethylmethacrylate, cellulose acetate, cellulose acetate-butyrate, polyesters and polyethers. Because the various mentioned synthetic organic polymeric plastics are not as elastomeric as the rubbers previously mentioned they will usually be more frequently employed when flap type covers, rather than peripherally fastened covers, are utilized. In such cases, to retain a desired shape, usually flat, the plastic may be reinforced, as by fiberglass, and may be filled or plasticized.

The covers, whether of peripherally fastened or flap design, are normally relatively thin and flat and may be held to the separating wall, also usually similarly thin and flat, by any of various suitable means, some of which have already been described. Thus, they may be bolted, sewn, stapled, cemented, fused or co-cured with the material of the wall or a suitable intermediate material. Various types of cements may be used, including expoxy resins, curable rubber latexes, polysulfides, thermoplastic resins, polyvinyl butyral, silicones and cyanoacrylates, among others.

The separating wall, with which the cover cooperates to produce the one-way wall, may be of the same material as the cover but usually is of a lower modulus of elasticity. Backing materials, for rigidifying the walls of the separating compartments, when that is desired, may be made of materials similar to those of the walls, but may be of a lower modulus of elasticity, as desired. Although the employment of elastomeric and flexible synthetic organic polymeric plastics, such as organic elastomers, is preferred for the separating wall and the cover and any reinforcements that may be used, including any peripheral flange that might be employed, other materials of construction may also be utilized, such as metals, e.g., aluminum, stainless steel, chromium- or nickel-plated brass, for the mentioned parts that are of greater rigidity or for flap-type covers for the separating walls.

The other walls of the compartments of the lower portion of the breakwater-barge-dock body (or bodies) will usually be of the same material as the separating walls but different flexible materials of the types previously described may also be employed and for the upper walls thereof rigid materials of construction, preferably synthetic plastics or hard rubbers, but also including metals, may be used. For the upper body portion and various components thereof it will generally be desirable to utilize rigid materials of construction, such as those previously named, although for particular parts, linings, lines and individual components, flexible elastomeric materials or combinations of such materials and rigid materials may be useful.

The breakwater-barge-dock bodies may be separate and independent walled bodies with lower, side and upstream walls thereof being of suitable flexible, preferably elastomeric material or they may utilize common separating walls. Normally, from 3 to 25 body portions will be held together by appropriate fastening means, with from 1 to 9, preferably 1 to 5 turbogenerators and appropriate manifold connections, either separately manifolded for each turbogenerator or commonly manifolded. Each of the body portions may have a separate rigidifying downstream wall (119) or such walls may be continuous along the length of the apparatus and may assist in holding the bodies together. Similarly, outer protective bottom cover 123, if employed, may be integral over the assembled apparatus or may be independently covering each part. The protective screen over the bottom portion, previously mentioned, may also be constructed for each body or may be integral and over the assembly of bodies.

In operation, the wave energy generator-breakwater-barge-dock apparatus is floated in a wave-containing body of water, either yieldably held in position by a vertical or horizontal line or lines or floating free, and the horizontal and vertical components of the wave motion alternately distort the flexible compartments over the entire length and width of the apparatus, creating unbalanced pressures on the separating walls thereof, which cause the damped, pulsating one-way flow of liquid through the openings (which usually are circular and of diameters in the range of 1 to 10 cm. but may be larger, even up to one meter, in some instances especially for one-opening flap covers, and of other shapes, e.g., rectangular) so as to force the liquid through the turbogenerator under a pressure which may be in the range of from about 100 mm. Hg at the turbogenerator entrance to as much as 10 kg./sq. cm. The kinetic energy of the flow of liquid is then utilized to drive turbogenerator 29 or to operate a pump, self-propelling means or other mechanical or electrical equipment. Means are usually provided so as to facilitate optimum positioning of the apparatus in the water for greatest responsiveness to wave and water flow effects and maximum power generation and such positioning may be automatic. The anchoring mechanism of FIG. 6 acts to hold the barge in essentially horizontal position and directly above the anchoring piers because weight 157 acts as a steadying influence, tending to return the barge to horizontal position after temporary change of position, either horizontally or vertically, due to wave motion. The shifting of the weight is effectively increased by the block and tackle arrangement and quickly causes a return of the apparatus to desired normal position.

In a modification of the described apparatus compartment 37, rather than being employed for flotation, may be a part of the breakwater, barge or dock working space and may contain machinery working quarters, etc. In such and other modifications of the apparatus it will be preferred to maintain the weight of the upper body portion as low as possible so that it may be supported and floated by the lower body portion. Normally, the density of the lower portion should be less than 0.9 g./ml., preferably less than 0.8 g./ml. and more preferably less than 0.7 g./ml. Of course, the weight of the upper portion will be limited by the buoyancy obtainable from the lower portion, due to its content of gas and, if present, a liquid that is lighter than the water on which the apparatus is floating.

In other variations of the invention, the shape of each of the breakwater-barge-dock bodies may be changed from rectangularly internally channeled, substantially regular trapezoidal shape in transverse cross-section to other suitable shapes, including channeled cylindrical. Also, the flexible compartments may be altered in shape, as may be the rigid compartments. It is preferred that the flexible compartments be of essentially triangular or truncated triangular cross-sections, as illustrated in FIG. 2 but square, rectangular and curved cross-sectional shapes are also useful. Instead of a motor-generator, a separate liquid (fluid) motor may be utilized with an independent generator or combination of generators. Means (not shown) may be supplied for varying and controlling the contents of gas and liquid in the various compartments and/or in the apparatus as a whole, to make the apparatus more responsive to particular wave conditions, to increase its efficiency and to prevent undesired loss of gas from a particular compartment, and such may be automatic.

In all modifications of the invention it will still be important to maintain the wave energy motor for producing liquid flow so that it includes a series of adjacent, common-walled flexible compartments subject to wave motion and distortable by such wave motion to produce differential pressures between the compartments which cause one-way flow of liquid through the one-way flow walls thereof so as to convert wave energy to liquid flow kinetic energy. Normally, such operation will be at a temperature of the body of wave-containing water but it is within the invention to utilize heat exchangers, if considered to be desirable, to modify the temperature of the internally flowing fluid.

Many of the advantages of this invention have already been referred but a few will be further detailed here. It provides an efficient and economical means for transforming both the horizontal and vertical forces of wave action into a one-way pulsed liquid flow, with the pulsations being evened out due to a series of gas-containing (and liquid-containing, too) compartments in which the gas, in addition to evening out pulsations, also provides a means of absorbing shocking forces applied to the apparatus of the invention by the waves. The compartments, being joined or made together, are subject to receipt of wave energy over their exposed surfaces and do not dissipate such energy as would be the situation if they were separated. The one-way walls are much more efficient than check valves and permit almost instantaneous reactions to wave forces, opening and closing within as little as a second, with large flows of liquid and high flow rates resulting when opened and complete halting of flow effected when closed. In addition to efficiently obtaining large quantities of energy from the wave motions at a high rate, the apparatus also provides a breakwater, a dock and a barge for use, depending on which application is desired. Furthermore, it may be used for various other purposes, for example, as an oil drilling platform or cargo vessel which derives part of its power from the waves. When the anchoring device of FIG. 6 is utilized automatic compensation is made for any changes in water level, such as result from changing tides, and the apparatus is held in best wave energy receiving position.

The invention has been described with respect to preferred embodiments but is not to be limited to these because it is evident that one of skill in the art will be able to employ substitutes and equivalents without departing from the scope of the invention.

What is claimed is:

1. A wave energy generator-breakwater-barge-dock which comprises an electric generator including relatively rotatable portions, the relative motion of which causes the production of electricity, means for relatively rotating such parts of the electric generator in response to liquid flow, a breakwater-barge-dock body for supporting the electric generator and the means for causing relative rotational motion of the parts thereof, which body comprises an upper portion and a lower portion, said lower portion being distortable in response to wave motions, having a plurality of flexible compartments therein with a gas inside said compartments at the tops thereof and a liquid inside said compartments at the bottoms thereof, a plurality of said compartments having flexible internal one-way flow walls separating them and said flexible compartments being communicated with the means for rotating the generator so that in response to wave motion liquid flows from a downstream compartment through the means for rotating the generator, causing rotation of said means, out said means and back to an upstream compartment and through the plurality of compartments having one-way flow walls separating them, to the downstream compartment.

2. A wave energy generator-breakwater-barge-dock according to claim 1 wherein the lower distortable portion of the body thereof is lighter than water and helps to float the rest of the generator-breakwater-barge-dock in water, the gas in the flexible compartments is air, each of the flexible compartments contains sufficient air to cushion shocks of internal liquid motions in response to wave motions and the one-way flow walls include separating wall portions containing openings therein and flexible covers located so as to be able to cover such openings and containing a plurality of openings therein and which, when said covers are pressed against said walls, prevent flow of liquid, due to disalignment of the openings in the separating walls and those of the covers and permit flow of liquid when said covers are separated from said walls.

3. A wave energy generator-breakwater-barge-dock according to claim 2 wherein the air in the flexible compartments occupies from 5 to 50% of the volumes thereof, the liquid inside said compartments is of a density in the range of 0.5 to 1.2 g./ml. at 20° C. and of a viscosity in the range of 0.2 to 100 centipoises at 20° C., the flexible covers of the one-way flow walls of the lower flexible portion of the body are of synthetic organic polymeric plastic, synthetic rubber or natural rubber, upstream flexible compartments have flexible external walls and flexible internal one-way flow walls separating them from other such compartments and a downstream compartment has a rigid external wall and has a flexible internal one-way flow wall separating it from an adjacent flexible compartment having a flexible external wall.

4. A wave energy generator-breakwater-barge-dock according to claim 3 wherein the air in the flexible compartments occupies from 10 to 25% of the volumes thereof, the liquid inside said compartments is of a density in the range of 0.7 to 1.1 g./ml. at 20° C. and of a vicosity in the range of 0.2 to 1.5 centipoises at 20° C., the flexible covers of the one-way flow walls of the lower flexible portion of the body are peripherally fastened to the separating walls of said one-way flow walls about the openings therein and the openings in the separating walls are in the lower linear 80% thereof and below the liquid levels.

5. A wave energy generator-breakwater-barge-dock according to claim 4 wherein the upper body portion is substantially rigid, with a substantial proportion thereof being above the normal water line of the waves of a body of water in which the wave energy generator-breakwater-barge-dock floats, the lower portion of said wave energy generator-breakwater-barge-dock is substantially located beneath said water level, the flexible covers of the one-way flow walls, when relaxed, lie flat against separating walls of said one-way flow walls, with openings in the covers and separating walls being disaligned, a plurality of breakwater-barge-dock bodies are joined together, with liquid flows to and from them being manifolded respectively from and to the means for relatively rotating the parts of the electric generator in response to liquid flow to generate the electricity and the external and internal walls of the lower flexible portions of the breakwater-barge-dock bodies are of a material selected from the group consisting of synthetic organic polymeric plastic, synthetic rubber and natural rubber.

6. A wave energy generator-breakwater-barge-dock according to claim 5 in which each of the bodies is of rectangularly internally channeled, substantially regular trapezoidal shape in transverse cross-section, yieldably held in position in a body of water having waves in motion therein, with the upstream compartment, with respect to internal fluid flow in the wave energy generator-breakwater-barge-dock compartments, being positioned so that it is subject to greater wave motion.

7. A wave energy generator-breakwater-barge-dock according to claim 6 in which each of the bodies includes two rigid compartments between the upstream-most and downstream-most flexible compartments, which rigid compartments each contains the same type of liquid as the flexible compartments, with cushioning air above such liquid and which communicate such liquid with the manifold communicating it with the means for relatively rotating the parts of the electric generator in response to flow of such liquid.

8. A wave energy generator-breakwater-barge-dock according to claim 7 wherein the means for relatively rotating parts of the electric generator and the generator are in a motor-generator combination.

9. A wave energy generator-breakwater-barge-dock according to claim 8 wherein the upper portion of the body is heavier than water and is supported and floated by the lower portion due at least in part to the presence in the flexible compartments thereof of a gas and a liquid of a density less than that of water.

10. A wave energy generator which comprises a series of adjacent common-walled flexible compartments subject to wave motion and distortable by such motion to produce differential pressures between said compartments, the common walls of which compartments have openings therein with flexible covers thereover having openings therein which are disaligned with the openings in the common walls when the covers are in place against said walls and which covers are separated from the walls when the pressure of contained liquid in said compartments is less on the cover sides of the walls than on the wall sides thereof so that the covers allow only one-way flow of the contained liquid through the series of compartments, and means communicating with upstream-most and downstream-most compartments, with respect to the movement of the contained liquid, for communicating such liquid with a motor-generator combination to generate electricity from the flow of the liquid.

11. A wave energy generator according to claim 10 wherein the compartments contain gas and liquid, with the gas occupying from 10 to 25% of the volumes thereof, the openings, flexible covers and the openings therein are in the lower linear 80% thereof, below the liquid levels, the gas in the flexible compartments is sufficient in quantities to cushion the shocks of liquid motions therein in response to wave motions and the covers are peripherally fastened to the common walls.

12. A wave energy generator according to claim 11 wherein the flexible covers and the internal and external walls of the flexible compartments are of synthetic organic polymeric plastic, synthetic rubber or natural rubber.

13. A wave energy motor for producing flow of liquid which comprises a series of adjacent common-walled flexible compartments subject to wave motion and distortable by such motion to produce differential pressures between such compartments, the common walls of which compartments have openings therein with flexible covers thereover which, when the covers are in place against said wall, prevent liquid flow through said openings and which covers are separated from the walls when the pressure of contained liquid in said compartments is less on the upper sides of the walls than on the wall sides thereof so that the covers allow only one-way flow of the contained liquid through the series of compartments.

14. A wave energy motor according to claim 13 wherein the flexible covers and the internal and external walls of the flexible compartments are of synthetic organic polymeric plastic, synthetic rubber or natural rubber, the compartments contain gas and liquid, with the gas occupying from 10 to 25% of the volumes thereof and being sufficient in quantities in the compartments to cushion shocks of liquid motions therein in response to wave motion, and the flexible covers and the openings in the compartment walls are in the lower linear 80% of such walls and below the liquid levels therein.

* * * * *